3,252,981
PROCESS FOR BENZILIC ESTERS
Joel Donald Whitaker, Newport, Tenn., assignor to Chemetron Corporation, Chicago, Ill., a corporation of Delaware
No Drawing. Filed May 24, 1963, Ser. No. 282,881
5 Claims. (Cl. 260—292)

This invention relates to an improved method for producing benzilic esters of aminoalcohols. More particularly the present invention is concerned with a unique isolation procedure for obtaining the previously referred to esters by means of crystallization in an aqueous medium.

The benzilic esters of aminoalcohols produced by the process of the present invention are represented by the following general formula

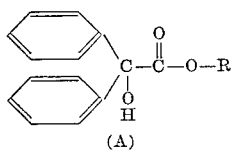

(A)

wherein R represents a heterocyclic radical containing at least one nitrogen atom, representative of which are quinuclidinyl, tropinyl and lower alkyl substituted piperidinyl. The N-methyl-4-piperidinyl derivative is a preferred alkyl substituted material in the present process, however, other N-lower alkyl piperidinyl compounds can be employed in the manner hereinafter described such as the N-ethyl, N-propyl and N-butyl derivatives. The term "lower alkyl" is meant to include straight or branched chained aliphatic groups. In all instances, the previously described nitrogen containing heterocycles are linked to the benzilic ester moiety through a carbon atom and not the nuclear nitrogen.

The compounds produced by the present process are well known for their antispasmotic and anticholinergic properties when present in the form of quaternary salts. Specifically, the quinuclidinyl benzilate ester resembles atropine in its medicinal properties.

In the past, the isolation of compounds described in Formula A has met with serious difficulties. Because of the complex chemical structures of the reactants and end product, numerous side reactions take place resulting in low yields of the desired end products. Several steps have therefore been necessary not only to carry out the desired synthesis but to isolate the end product resulting in a process which requires extended periods of time. This results in high operational costs as well as the tying up of equipment which could be instead used in other commercial processes.

It is therefore an object of the present invention to provide a process for producing benzilic esters of aminoalcohols which results in high yields of product having a high degree of purity.

It is another object of this invention to provide an overall process for manufacturing the described esters comprising a minimum number of steps making the process commercially acceptable from a cost and handling standpoint.

It is still another object to provide a method for isolating benzilic esters of aminoalcohols as the desired end product directly from the reaction mixture by a single aqueous extraction step without the need for further extraction procedures.

It has been found that the isolation procedure of the present invention can be advantageously employed for recovering the benzilic esters concerned with in this invention when prepared by the following general reaction sequence wherein R is a radical as previously defined in Formula A (1) 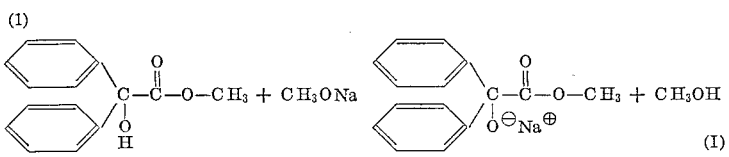

(2) 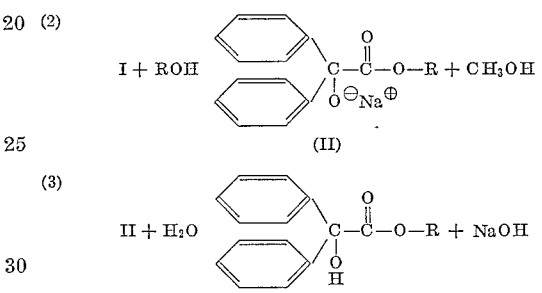

(3)

$$II + H_2O \longrightarrow \text{[benzilate]} + NaOH$$

Basically, the above described reaction is a transesterification reaction of methyl benzilate by the alcohol derivative ROH with the use of sodium alkoxide as a catalyst. It will also be recognized that other alkali metal lower alkoxides can be used such as potassium in place of the sodium with the term "lower alkoxides" referring to a carbon chain of about 1–4 carbon atoms. Correspondingly, the methyl benzilate can be a lower alkyl ester benzilate comprising the previously designated number of carbon atoms. Alternatively, compound I can be formed directly from the sodium or potassium metal rather than through the corresponding sodium alkoxide in a manner well known in the art. Steps (1) and (2) of the general reaction take place in rapid sequence upon the simultaneous addition of sodium methylate, methyl benzilate and the alcohol derivative in a suitable organic, water-immiscible solvent such as toluene, benzene, xylene and mixtures thereof. Stoichiometeric quantities of the reactants can be employed but an excess of the benzilate and the methylate has been found to give better results.

Equations 1 and 2 represent equilibrium reactions and depend upon the complete removal of the methanol from the interaction of the initial reactants. This is accomplished by slow azeotropic distillation of the methanol with the toluene solvent until the boiling point of toluene is attained.

After formation of the sodio derivative of the ester (II) the reaction mixture is preferably cooled to about 5° C. and a substantial excess of water is added sufficient to hydrolyze the sodio salt of the hydroxy ester (II) and form a dilute solution of the sodium hydroxide formed as a result of the hydrolysis. The reaction mixture at this stage should be below about 25° C. during the addition of the water but can be as high as 40° C. A temperature range of about 0–25° C. is preferred. In a like manner the water being added should also be within the same temperature range although 0–5° is preferred. The hydrolyzed mixture is agitated until precipitation begins at the interface of the water and the water-immiscible toluene. Without further agitation the reaction mixture is cooled to 0–5° C. and maintained at this temperature range for about one to two hours depending upon the product, which will be apparent from the following examples. Upon cooling, the entire mixture is vacuum filtered to collect the precipitated crystalline material as a filter cake. If desired, the filter cake can be further washed with cold solvents in which the product is substantially insoluble. Representative of such solvents are toluene, water, acetone and mixtures thereof. The preferred temperature of these solvents should be about 0–5° C.

The following examples further illustrate this invention but it would be understood that they are not intended to limit the scope of the invention in any way.

*Example I*

Into a 500 ml. flask is placed 130 ml. of dry toluene. To the toluene is added 2.9 g. (0.053 mole) of sodium methylate, 15 g. (0.062 mole) of methyl benzilate and 5.2 g. (0.041 mole) of 3-quinuclidinol. The reaction mixture is slowly heated while stirring and about 65 ml. of distillate containing methanol formed from the reaction mixture is distilled off. The remaining solution is subsequently cooled to afford addition of 60 ml. of fresh toluene.

The cooled reaction mixture is additionally cooled to a temperature of 5° C. and 25 ml. of water having a temperature of 0–5° C. is added. The resulting solution is agitated until precipitation begins. Once precipitation starts the agitation is immediately discontinued and the reaction mixture is cooled in an ice bath for one hour at a temperature of about 0–5° C.

Upon completion of the one hour period, the mixture containing the precipitated product is filtered with suction by means of a Buchner funnel and the white filter cake resulting therefrom is washed once with 10 ml. of cold toluene having a temperature of 0–5° C. and subsequently with two washes of 5 ml. each of cold acetone the temperature of which is also 5° C. Upon drying in air, the 3-quinuclidinyl benzilate filter cake weighs 13.3 g. which is a yield of 96.5% based on the amount of 3-quinuclidinol employed. The desired end product has a purity of 99.5% and a melting point of 164–166° C.

*Example II*

The same procedure is followed as outlined in Example I except that 50 ml. of water are added to the cooled reaction mixture after it is cooled to a temperature of 5° C. In a similar manner the added water also has a temperature of 0–5° C. This procedure results in a yield of 13.2 grams of the 3-quinuclidinyl benzilate. This is a 95.6% yield with the product having a purity of 98.0% and a melting point of 163.5–165.5° C.

*Example III*

Into a 500 ml. flask is added 130 ml. of dry toluene. To the toluene solvent is added 5.8 g. (0.041 mole) of tropine, 15 g. (0.062 mole) of methyl benzilate and 2.9 g. (0.053 mole) of sodium methylate. The reaction mixture is slowly heated while stirring to distill off about 70 ml. of methanol formed from the reaction mixture. The remaining solution is subsequently cooled to afford addition of 60 ml. of fresh toluene.

Additional cooling of the resulting mixture is effected to bring it to a temperature of 5° C. and 50 ml. of water having a temperature of 0–5° C. is added. The hydrolyzed mixture is agitated to start precipitation. Immediately thereafter the agitation is discontinued and the reaction mixture is cooled for two hours at 0–5° C. The precipitated product, tropinyl benzilate, is recovered by filtration and the filter cake is washed with two washes of 5 ml. of toluene having a temperature of about 0–5° C. The desired product is air dried giving a yield of about 9.3 grams. The tropinyl benzilate has a melting point of 146–148° C.

*Example IV*

Dry toluene in an amount of 130 ml. is placed in a 500 ml. flask. To the toluene is added 4.7 g. (0.041 mole) of N-methyl-4-hydroxypiperidine, 15.0 g. (0.062 mole) of methyl benzilate and 2.9 g. (0.053 mole) of sodium methylate. The resulting mixture is slowly heated while stirring and 70 ml. of methanol formed in the reaction is distilled off. Sixty ml. of toluene is added to the remaining solution after it is cooled to facilitate the addition.

Additional cooling of the mixture is effected to bring it to a temperature of 5° C. Water having a temperature of 0–5° C. in a volume of 25 ml. is added to the cooled solution and the solution agitated for five minutes to effect precipitation. After the five minute period, the agitated mixture is allowed to stand in an ice bath for one hour. Thereafter, the resulting mixture containing the precipitated product, N-methyl-4-piperidinyl benzilate, is filtered with suction and the filter cake washed with 10 ml. of cold toluene having a temperature of 5° C. The desired end product is air dried giving a yield of about 9.0 grams and has a melting point of 163° C.

It will be seen from the foregoing description that a process is now provided which is acceptable by all commercial standards for isolating benzilic esters of aminoalcohols. The procedure involves a minimum number of steps since the hydrolysis, crystallization and filtration can be carried out without removal from the initial reaction vessel. No special solvents need be employed. Further, a solid product is readily recoverable from the reaction mixture by a process with a minimum amount of equipment and handling.

Prior to the present process it was believed that water could not be used to isolate benzilic esters of aminoalcohols directly from the reaction medium because of the undesired saponification of the end product itself. However, it has now been discovered that not only can water be employed but when added to the reaction mixture containing the alkali metal derivative of the benzilic ester of the aminoalcohol that the desired end product readily precipitates from the reaction mixture as a solid with essentially no saponification.

Others may readily adapt the invention for use under various conditions of service by employing one or more of the novel features disclosed or equivalents thereof. All such which do not depart from the spirit of this disclosure are intended to be within its scope, which at present advised is best defined in the appended claims.

I claim:

1. In a process for preparing compounds having the formula:

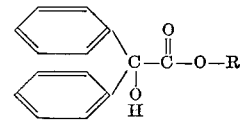

wherein R represents a member of the group consisting of quinuclidinyl, tropinyl and lower alkyl substituted piperidinyl, said process including the formation of an alkali metal salt of a hydroxy ester of the formula

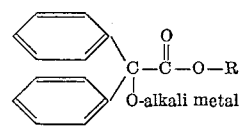

wherein R is as previously defined, the improvement comprising hydrolyzing said alkali metal salt of said hydroxy ester and recovering said desired ester as a solid precipitate solely by means of a substantial excess of water at a temperature not in excess of about 40° C. and recovering said solid product from the aqueous reaction mixture without further extraction procedures.

2. In a process for preparing 3-quinuclidinyl benzilate wherein an alkali metal salt of a hydroxy ester of 3- quinuclidinyl benzilate ester is formed the improvement comprising hydrolyzing said alkali metal salt of said hydroxy ester and recovering said desired ester as a solid precipitate solely by means of a substantial excess of water at a temperature not in excess of about 40° C. and recovering said solid product from the aqueous reaction mixture without further extraction procedures.

3. In a process for preparing tropinyl benzilate wherein an alkali metal salt of a hydroxy ester of tropinyl benzilate ester is formed, the improvement comprising hydrolyzing said alkali metal salt of said hydroxy ester and recovering said desired ester as a solid precipitate solely by means of a substantial excess of water at a temperature not in excess of about 40° C. and recovering said solid product from the aqueous reaction mixture without further extraction procedures.

4. In a process for preparing a lower alkyl substituted piperidinyl benzilate wherein an alkali metal salt of a hydroxy ester of the lower alkyl substituted piperidinyl benzilate is formed, the improvement comprising hydrolyzing said alkali metal salt of said hydroxy ester and recovering said desired ester as a solid precipitate solely by means of a substantial excess of water at a temperature not in excess of about 40° C. and recovering said solid product from the aqueous reaction mixture without further extraction procedures.

5. In a process for preparing N-methyl-4-piperidinyl benzilate wherein an alkali metal salt of a hydroxy ester of N-methyl-4-piperidinyl benzilate ester is formed, the improvement comprising hydrolyzing said alkali metal salt of said hydroxy ester and recovering said desired ester as a solid precipitate solely by means of a substantial excess of water at a temperature not in excess of about 40° C. and recovering said solid product from the aqueous reaction mixture without further extraction procedures.

References Cited by the Examiner
UNITED STATES PATENTS

| | | | |
|---|---|---|---|
| 2,235,661 | 3/1941 | Wolfes et al. | 260—292 |
| 2,394,770 | 2/1946 | Hill et al. | 260—294.3 X |
| 2,843,593 | 7/1958 | Farkas et al. | 260—294.3 |
| 3,094,532 | 6/1963 | Blicke et al. | 260—294 X |
| 3,118,896 | 1/1964 | Pianfetti et al. | 260—294.3 |

WALTER A. MODANCE, *Primary Examiner.*

JOHN D. RANDOLPH, *Examiner.*

MARION W. WESTERN, J. M. FORD,
*Assistant Examiners.*